Dec. 8, 1931.                C. BRADLEY                1,835,631
REMOTE CONTROL
Original Filed Nov. 17, 1930
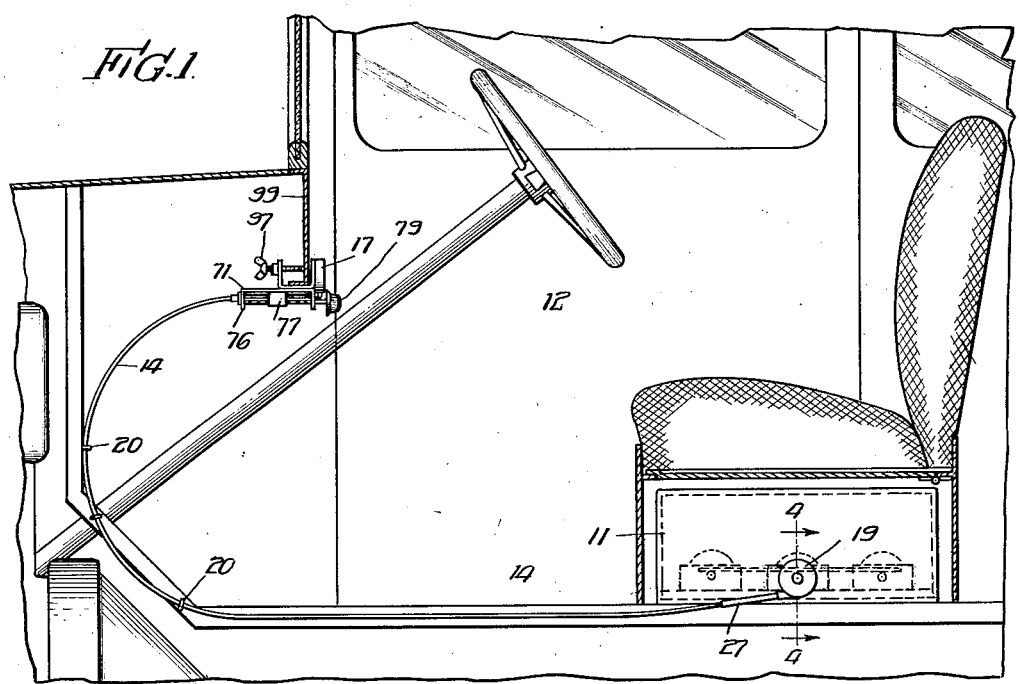
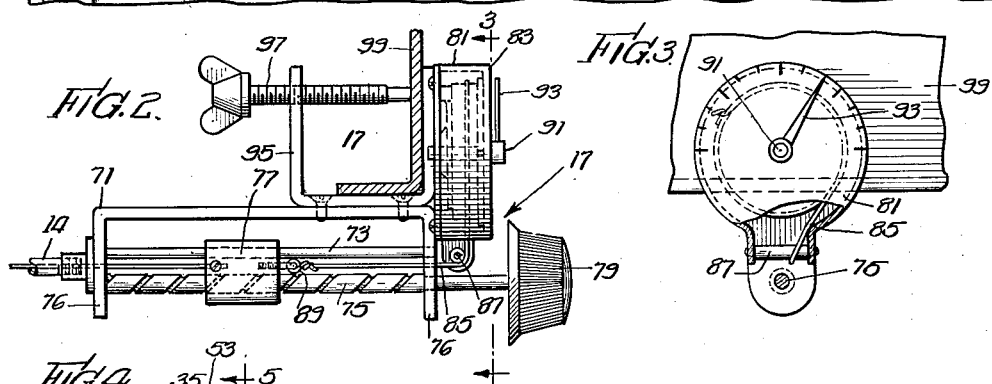
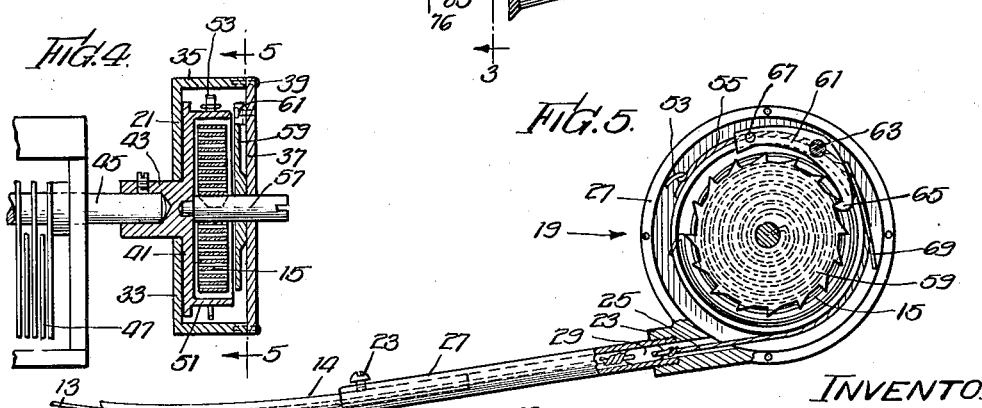
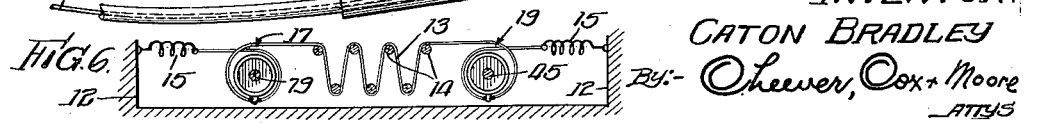
INVENTOR:
CATON BRADLEY Patented Dec. 8, 1931

1,835,631

UNITED STATES PATENT OFFICE

CATON BRADLEY, OF CHICAGO, ILLINOIS

REMOTE CONTROL

Application filed November 17, 1930, Serial No. 496,151. Renewed October 12, 1931.

The present invention relates in general to remote control apparatus whereby, upon movement of an adjustable control member located at a remote point from a device to be actuated, said device will be moved exactly into correspondence with the movement of the control member and free of any loss of motion.

While I have illustrated my device as applied to remote control of radio receiving sets, and particularly in connection with its application to an automobile when any control shaft mounted beneath the driver's seat is operated from the dashboard, I wish it to be understood that the showing is for purposes of exemplification and not by way of limitation, since the device is broadly applicable to remote control wherein compactness, simplicity of operation, fineness and faithfulness of adjustment and ease of operation are advantageous. In order to explain one of the best applications of my invention, I will therefore describe it in connection with remote control for a radio receiving set applied to an automobile.

The tuning of condensers of radio receiving sets requires angular adjustability of the condenser shaft 45 to any one of the relative angular positions through which the shaft turns between its limits of adjusting movement. In the remote control for such tuning devices, the rotatable member 79 likewise must be capable of being adjusted to any relative angular position whatever in order to accomplish sharp tuning, and the tuning knob 79, when turned to any particular position to secure the corresponding tuning adjustment in the shaft 45, must remain stationary in such position. My device fulfills the above requirements since the knob 79 is adjustably turnable throughout all degrees of tuning and is stationarily held in proper tuning position.

By means of the balanced tension on the connector 13, the movement of the knob 79 is faithfully and instantly imparted to the shaft 45 so that no variation is possible. In addition, by means of the balanced spring tension on the flexible connector which holds it in any longitudinally and adjustably set position, I am enabled to use a very quickly adjustable means for moving the flexible connector longitudinally to secure quick tuning.

Radio sets installed in automobiles have, in the past, been mounted in the cowl space behind the instrument board, the control shafts being carried forwardly of the instrument board in position for manipulation by the driver of the automobile or other occupant of the front seat. Such an arrangement is undesirable because the set is hard to reach when in need of attention, because the set occupies space which in small cars is frequently needed for leg room, because the set is difficult to install in the cramped and inaccessible position behind the instrument panel and because special and relatively expensive support brackets and the like are necessary to hold the apparatus in place, thus increasing installation costs, and because the operation of the set is interfered with by the magnetic forces and fields of magnetic influence set up by the auto ignition system which has connections behind the instrument board. Numerous advantages point to other places as the logical location of the radio set. The space under the front seat adjacent the storage battery is a location infinitely better than the position behind the instrument panel which position is at present dictated by circumstances which I propose to overcome by means of my present invention. The difficulty has resided in the lack of a cheap, simple, light, compact and positively acting remote control mechanism, which lack prevents the mounting of sets in the most satisfactory location in automobiles and necessitates the arrangement of the set in a position such that its controls are convenient to the hand of the operator, that is to say, the lack of an adequate remote control prescribes the position of the set, back of or near the instrument panel of the automobile, the operator of the set being usually the driver or other front seat rider of the auto.

One of the important objects of my present invention is to provide adequate, inexpensive, positively operating remote control apparatus, especially adapted for use with radio sets, and more particularly radio sets mounted in automobiles whereby the set may be mounted in the most desirable location while controlled through the device of my invention from any suitable control point, my object being to simplify the installation of radios in automobiles by making it possible to arrange the set in the most convenient set location, to safeguard the set itself by mounting it where vibration is least, that is, near the center of gravity of the automobile, and to reduce the cost of set installation and repair by installing the set in the most accessible position, all this without sacrificing accuracy and ease of set adjustment or the positive precise nature of operation necessary in the control of a precision device, such as a radio set.

Another important object is to provide a neat compact remote control device which can be installed in any desired location, which has a neat appearance, is simple and inexpensive in construction and positive in operation, so that the controlled apparatus will be instantaneously affected in response to a control impulse imparted to the control apparatus at the remote control point. A further object of the invention is to provide a control apparatus having a flexible operating member which is provided with tension means on each end thereof in combination with a member for causing movement of the flexible member for controlling the operation of a member to be controlled.

A still further object is to provide a flexible member operatively connected to a pair of rotatably mounted spring urged members, the members being urged in opposite directions, and a slidably mounted member having means cooperating therewith for translating the slidably mounted member to cause movement of the flexible member whereby one of the rotatably mounted members is free to rotate and effect adjustment of a rotatably mounted shaft.

These and numerous other objects and advantages of my present invention will be apparent as the invention is more fully understood from the following description which taken with the accompanying drawings discloses a preferred embodiment of the invention.

Referring to the drawings:

Figure 1 is a vertical cross section taken through the forward portions of the tonneau of an automobile, illustrating a remote controlled device embodying my present invention as applied in the installation of radio equipment in automobiles.

Figure 2 is an enlarged portion showing a part of the remote control device illustrated in Figure 1.

Figure 3 is a sectional view taken substantially along the line 3—3 in Figure 2.

Figure 4 is a vertical section taken substantially along the line 4—4 in Figure 1.

Figure 5 is a view taken substantially along the line 5—5 in Figure 4.

Figure 6 is a diagrammatic view showing the kinematic relationship of the various parts.

To illustrate my invention, I have shown on the drawings a radio set 11 and a remote control embodying my invention, the same being shown installed in an automobile 12. The radio set 11 may, of course, be arranged in any suitable location in the vehicle, but I have shown it positioned in the space under the front seat, the same being a convenient location facilitating installation and eliminating the necessity of expensive support means and furthermore permitting ready access to the set in case repairs or adjustments are necessary.

The location under the front seat is also desirable since the space is otherwise wasted or devoted to a compartment for the carrying of tools and the like. The location is also desirable since it is near the center of gravity of the vehicle, so that vibration is a minimum at this point, making it desirable for the installation of delicate apparatus, such as the radio set.

I have provided a convenient remote control for tuning the radio set from a point convenient to the hand of a person seated in the automobile. This remote control as indicated in Figure 6 consists primarily of a flexible member 13 suitably supported along a circuitous path from the body or frame 12 of the vehicle as by the guide means 14 and extending from the control point to the device to be controlled, means to resiliently maintain the flexible member under tension, while permitting longitudinal movement thereof, means 17 to impart longitudinal movements in said member at said control point, and means 19 at the other end of the member to transform the longitudinal movement of the member 13 into device controlling movement.

The means to resiliently hold the flexible member in tension preferably comprise springs 15 and 15' arranged at the opposite ends of the member 13, the spring 15 being located at the device being controlled and the other at the remote control point. The device 11 is provided with a shiftable member preferably a shaft 45 rotation of which accomplishes adjustment of the device and the spring 15 is connected to normally urge the shaft to rotate in one direction. The member 13 also is connected to the shaft in such a way as to rotate the shaft against the urge of the spring 15, if shifted in one direction, i. e., away from the device 11 and toward the remote control point —and to permit the spring 15 to rotate the shaft when the member 13 is permitted to move toward the device 11. In order to keep the member 13 in a state of equilibrium, its end at the remote control point is connected to a spring 15', which exerts a tension on the member substantially equal and opposite to the tension of the spring 15 so that at no time does the apparatus tend to pull itself out of a desired control setting, as would be the case if the spring 15 alone were employed. At the remote control point a manually operable member 79 is provided. The member is operable through suitable mechanism which will hereinafter be more fully described to impart longitudinal movement in the device 11, whereby the spring 15 will be permitted to rotate the shaft 45 to a desired setting or whereby the shaft will be rotated by the movement of the member 13 against the tension of the spring 15 to a desired setting.

Obviously in such a system the position of the operating handle 79 at any instant will indicate the adjustment of the device 11 and I take advantage of this by employing the movement of the handle 79 to operate a visible gauge located at the remote control point and calibrated to indicate the setting of the device 11.

The flexible member 13 is preferably formed as a thin, strong, flexible wire, and piano wire may be used for the purpose since the same is extremely tough and durable and provides maximum strength with minimum cross sectional dimension. The wire 13 is encased in means, preferably a flexible, fairly tough sheath 14, which not only provides protection for the wire, but also forms a guideway through which the wire may move longitudinally as hereinafter more fully described. The sheath 14 with wire 13 enclosed therein, may be arranged in any desired circuitous path extending from the means 19 to apparatus 17 located at the point from which the device 11 is to be controlled, the sheath being secured in the desired path by means of staples 20 or other suitable or convenient fastening means.

The means 19 located at the device 11, for transforming the longitudinal movement imparted to the member 13 by means 17 into set adjusting movement, comprises a flat cylindrical casing 21 fixed to the frame or chassis of the device 11, which in turn is fastened to the automobile. The casing 21 is provided with a boss 23 extending tangentially of the circular walls of the casing, the boss being provided with a bore 25 extending tangentially into the interior of the casing. The bore is threaded to receive the threaded end of a sleeve 27 into which the end of the sheath 14 is fastened as by the set screw 24, swedging or other means. The end of the wire 13 extends beyond the end of the sheath 14 into the sleeve 27 and is fastened to a floating plug or plunger 29 which is slidable in the bore of the sleeve. The casing 21 consists in the illustrated embodiment, of a circular back 33 having integral forwardly extending annular walls 35 forming a rather flat cylindrical casing, the open end of which is provided with a circular cover 37, suitably secured to the walls 35, as by the fastening members 39. Within the casing 33, and resting against the back thereof, is arranged a rotatable bobbin or spindle 41 comprising a disc having an integral portion 43 extending rearwardly and centrally of the disc through a central perforation in the back wall of the casing 27. This portion 43 is formed with an axial socket in its outer end, which socket is adapted to receive the forward end of a control shaft 45 of the device 11, said shaft usually comprising the rotatable shaft of a variable condenser 47, the adjustment of which provides for tuning the radio set.

The spindle 41 is provided with a forwardly extending peripheral flange 51 which is provided with an integral struckout hook 53 to which the looped end of a flexible member 55 may be fastened, the member 55 extending around the periphery of the annular flange 51, passing thence through the bore 25 to be fastened to the sliding plug 29. Thus when longitudinal movement away from the device 11 is imparted to the member 13 by the operation of means 17, the spindle 41 will be rotated in a clockwise direction viewing Figure 5 and the control shaft 45 of the device 11 will be rotated in one direction to adjust the device in response to the manipulation of the control means 17.

In order to permit control movement of the shaft 45 in the reverse direction when the movement of the member 13 is toward the device 11, I provide the resilient means 15 comprising a coil spring mounted within the casing 21 to normally urge the spindle 41 in a counter clockwise direction viewing Figure 5 in order that the spindle and shaft 45 may be correspondingly rotated in such direction when the control member 13 is permitted to move toward the device 11 by the operation of the mechanism 17.

The spring 15 is connected at its outer end to the inner side of the flange 51 and at its inner end to a stub shaft 57 supported at one end in a socket formed in the spindle 41 and extending forwardly through a central opening in the casing cover 37 in which it is journalled. The forward end of the shaft 57 is slotted or otherwise provided with means permitting the said spring to be tensioned by the rotation of the shaft 57. The shaft is also provided with a ratchet wheel 59 mounted for rotation with the shaft behind the cover 37 and the cover is provided with a ratchet detent 61 pivoted on a pin 63 carried by the cover. The detent 61 has a head finger 65 at one end to engage the teeth 67 of the ratchet wheel to prevent rotation of the wheel in a clockwise direction viewing Figure 5 but permitting rotation of the wheel and shaft in a counter clockwise direction to tension the spring 15 in a direction so that it will normally urge the spindle 41 in a counter clockwise direction. The detent is or may be provided with means 69 to urge the finger into contact with the dented periphery of the wheel 59 and the detent also has a pin 67 extending through the cover so that the lever may be depressed to disengage the detent from the ratchet to permit the spring to be unloaded.

At the control end of the member 13, the sleeve 14 is fastened into a frame 71 carrying a rod 73 and a threaded shaft 75 in parallel relation. The frame 71 comprises a lug providing spaced apart arms 76 between which the rod and shaft are mounted. The rod carries a member 77 slidingly thereon, the member being movable on the rod between the arms 76. The member 75 also is threaded through the member 77 so that rotation of the member 75 will cause the member 77 to move along the rod 73. The end of the member 13 extends beyond the sleeve 14 and is fastened to the member 77. The shaft 75 is extended forwardly through one of the ears 76 and is provided with a knob 79 by which it may be rotated manually to thereby impart longitudinal device controlling movement to the flexible member 13.

In order to balance the tension of the resilient spring 15 of the mechanism 19 and to maintain the system in equilibrium so that the spring will not be continuously tending to shift the control from adjusted position, I provide a similar spring 15' in the device 17 which spring is arranged to exert a pull upon the member 13 where it engages the mechanism 17 equal and opposite to the pull of the spring 15 at the opposite end of the member.

The spring 15' is housed in a casing 81 mounted on the bracket 71, one end of the spring being fastened, through suitable ratchet and tensioning mechanism similar to the devices 57, 59 and 61 of the device 19, to the casing while the other end is connected to a spindle 83 journalled in the casing and having a flange similar to the flange 51 of the device 19. The flange carries a flexible member 85 similar to the member 55 of the device 19 and the free end of the member 85 extends out of the casing 81 and around a pulley or guide 87 and is connected as at 89 to the sliding member 77.

The spindle 83 also is provided with an outwardly extending shaft 91 to which a pointer 93 or other indicator means may be mounted for the purpose of providing a visible gauge to indicate the setting at which the apparatus may be adjusted at any instant so that the adjustment of the controlled device 11 may be determined at the remote control point where the adjustment is made. The device 17 may also be provided with suitable means, in the drawings, a clamp comprising a bracket 95 secured to the frame 71 and a thumb screw 97 is shown, whereby the device 17 may be secured in place as to the instrument panel 99 of the automobile in which the device is installed.

It is thought that the invention and numerous of its attendant advantages will be understood from the foregoing description and it is obvious that numerous changes may be made in the form, construction and arrangement of the various parts without departing from the spirit and scope of the invention or sacrificing any of its material advantages, the form herein described being a preferred embodiment of the invention.

Having thus described my invention what I claim as new and desire to secure by Letters Patent is:

1. In combination with a controllable apparatus having a rotatable shaft to effect adjustment thereof, remote control means for imparting rotary movement to said shaft from a remote control point comprising spring means mounted in position to continuously urge the shaft in one direction, a flexible connection extending from the shaft and connected to the remote control point and connected with the shaft so that when the connector is pulled it will impart a rotational urge to the shaft opposite to that imparted by the spring means, means for supporting said flexible member in a pre-determined path, spring means at said remote control point for exerting tension on said flexible member equal and opposite to the tension exerted by said first mentioned spring means and means at said remote control point for shifting the flexible member longitudinally in either direction, whereby to permit the spring means to rotate the shaft in one direction or to rotate the shaft in the opposite direction against the urge of said spring.

2. A system as set forth in claim 1 having indicator means at said remote control point actuated by the movement of said member moving means, whereby the adjustment of the shaft may be indicated at said remote control point.

3. The combination of a rotatable shaft a rotatable member associated with said shaft, urging means tending to rotate said shaft in a predetermined direction, a remotely situated rotatable member a flexible member connecting the two rotatable members and being constantly under tension, means urging the remotely situated rotatable member in a direction so as to pull upon the flexible member in opposition to the pull imparted thereon by the first mentioned urging means, whereby to hold the flexible member constantly under tension, and means for moving the flexible member and causing rotation of the two rotatable members.

4. The combination of a rotatable shaft; a rotatable member associated with said shaft, urging means tending to rotate said shaft in a predetermined direction, a remotely situated rotatable member, means urging the remotely situated rotatable member in a direction opposite to the first rotatable member, a flexible member connecting the two rotatable members and being constantly under tension, a member interposed in said flexible member, and means engaging said last named member whereby operation of said last named member will cause movement of the flexible member and permit the first named rotatable member to rotate and operate the shaft.

5. The combination of a rotatable shaft, a rotatable member associated with said shaft, urging means tending to rotate said shaft in a predetermined direction, a remotely situated rotatable member, means urging the remotely situated rotatable member in a direction opposite to the first rotatable member, a flexible member connecting the two rotatable members and being constantly under tension, a slidably mounted member interposed in the flexible member, and a member cooperating with the slidable member to translate said slidable member and move the flexible member causing rotation of said shaft.

6. A control apparatus comprising a flexible member, tension means on each end of said flexible member and pulling in opposite directions, a member interposed intermediate the ends of the flexible member, means cooperating with the last named member for effecting movement of the flexible member, and an operating member operatively connected with the flexible member and controlled thereby.

7. A control apparatus comprising a flexible member, tension means on each end of said flexible member and pulling in opposite directions, a slidably mounted member interposed intermediate the ends of the flexible member, adjustable control means engaging the slidably mounted means to effect translation thereof and thereby move the flexible member, and an operating member operatively connected to the flexible member and controlled thereby.

8. A remote control device comprising a turnable shaft, a spring-operated take-up reel associated with said shaft, a flexible connector adapted to have one end wind and unwind upon said take-up reel, a second spring-actuated take-up reel adapted to have the opposite end of said flexible connector wind and unwind thereon, said second take-up reel having its spring arranged so as to act in opposition to the springs of the first take-up reel, whereby to hold the flexible member in tensioned position, and means cooperating therewith for holding said tensioned flexible member in any adjusted position, and means for shifting the flexible member endwise.

9. A remote control device for a radio receiving set comprising a bracket, a spring take-up reel mounted on said bracket, including a graduated scale and a relatively shiftable indicating member, a flexible connector operatively associated with said spring take-up reel and having one end thereof adapted to wind and unwind on said reel, a second spring take-up reel having a member adapted to be connected with an adjustable part for a radio receiving set, and having the other end of said flexible member adapted to wind and unwind upon said second reel, the springs of said reels being arranged to pull on said flexible member in opposition to each other, and a remote control member for causing endwise movement of said flexible member, whereby to adjust the radio part to correspond with the adjustment of said dial.

10. A remote control tuning apparatus for a radio receiving set comprising in combination with a condenser element adjustably turnable through every angular adjustment between its maximum adjustable tuning positions, remote control means for imparting rotary tuning adjustment throughout every angular position of said condenser shaft comprising spring means mounted in position continuously to urge the shaft in one direction, a flexible connector extending from the shaft to a remote control point and connected with the shaft so that when the flexible connector is pulled it will impart a rotational urge to the shaft opposite to that imparted by the spring means, means for supporting said flexible connector in a predetermined path, yielding means at said remote control point for resisting the tension exerted by said first mentioned spring means, and means at said remote control point adjustably turnable through every angle of rotation for shifting the flexible connector longitudinally in one direction against the urge of the spring means, and in the other direction to permit the spring means to rotate the shaft in the opposite direction.

11. In combination with a controllable apparatus having a turnable shaft to effect adjustment thereof, remote control means for adjustably turning and setting said shaft in every angular position throughout its range of adjustment from a remote control point comprising spring means mounted in position continuously to urge the shaft in one direction, a flexible connection extending from the shaft to the remote control point and connected with the shaft so that when the connector is pulled it will impart a rotational urge to the shaft opposite to that imparted by the spring means, means for supporting said flexible member in a predetermined path, yielding means at said remote control point for resisting the tension on said flexible member exerted by said first mentioned spring means, and means at said remote control point for adjustably shifting the flexible member longitudinally in one direction whereby to permit the spring means to rotate the shaft in one direction and for shifting the flexible member longitudinally in the opposite direction to rotate the shaft in the opposite direction against the urge of said spring means.

12. In a device of the class described, the combination of an adjustably turnable member adapted to be adjustably set in any and every relative angular position between its extreme adjusted positions, a remotely situated control member, a flexible member connecting said members, resilient means disposed at one end of said flexible member and tending to pull it in one direction, means located at the opposite end of said flexible member and co-operating with said spring means whereby adjustably to hold said flexible member in longitudinally tensioned equilibrium, and additional means for moving the flexible member longitudinally whereby to set the adjustable member in any angular position between its extreme adjusted positions, the longitudinal tension on said flexible member being maintained during the longitudinal movement of said flexible member.

In witness whereof, I have hereunto subscribed my name.

CATON BRADLEY.